US008774236B2

(12) United States Patent
Ter-Mikirtychev

(10) Patent No.: US 8,774,236 B2
(45) Date of Patent: Jul. 8, 2014

(54) ULTRAVIOLET FIBER LASER SYSTEM

(75) Inventor: Valeri V. Ter-Mikirtychev, Mountain View, CA (US)

(73) Assignee: Veralas, Inc., Mountain View, CA (US)

( * ) Notice: Subject to any disclaimer, the term of this patent is extended or adjusted under 35 U.S.C. 154(b) by 194 days.

(21) Appl. No.: 13/588,426

(22) Filed: Aug. 17, 2012

(65) Prior Publication Data

US 2013/0044768 A1    Feb. 21, 2013

Related U.S. Application Data

(60) Provisional application No. 61/524,884, filed on Aug. 18, 2011, provisional application No. 61/524,436, filed on Aug. 17, 2011.

(51) Int. Cl.
*H01S 3/30* (2006.01)

(52) U.S. Cl.
USPC ............... 372/6; 372/5; 372/22; 372/21

(58) Field of Classification Search
USPC ................................ 372/5, 6, 22, 21
See application file for complete search history.

(56) References Cited

U.S. PATENT DOCUMENTS

| 7,008,414 B2 | 3/2006 | Owa | |
| 7,212,275 B2 * | 5/2007 | Ohtsuki | 355/67 |
| 2002/0168161 A1 * | 11/2002 | Price et al. | 385/123 |
| 2007/0263680 A1 * | 11/2007 | Starodoumov et al. | 372/22 |

OTHER PUBLICATIONS

Kouznetsov, Dimitri, "Surface loss limit of the power scaling of a thin-disk laser", J. Opt. Soc. A,. B, vol. 23, No. 6, Jun. 2006, pp. 1074-1082.
Nicolaseu, R., "Generation of narrow linewidth pulses via amplification in a chain of fiber/bulk amplifiers", CLEO 2000 Conference, May 12, 2000, p. 600-601.
Lamarini, S., "Directly diode-pumped hig-energy Ho:YAG oscillator", Optic Letters, vol. 37, No. 4, Feb. 15, 2012, p. 515-517.
Rochat, Etienne, "Fiber amplifiers for coherent space communications", IEEE Journal on Selected Topics in Quantum Electronics, vol. 7, No. 1, Jan.-Feb. 2001, p. 64-81.
Sakuma, Jun, "True CW 193.4-nm light generation based on frequency conversion of fiber amplifiers", Optics Express, vol. 19, No. 16, Aug. 1, 2011, p. 15020-15025.

* cited by examiner

*Primary Examiner* — Kinam Park
(74) *Attorney, Agent, or Firm* — Barry N. Young

(57) ABSTRACT

Laser master oscillator—power amplifier system for generating high pulse energy, high average power laser pulses in the ultraviolet 191.25-201.25 nm and 243-246.25 nm spectral ranges, and in the visible 450-537.5 nm spectral range with controllable pulse duration and pulse repetition rate employ a master oscillator seed laser operating in the infra-red spectral range, and a single series connected chain of hybrid fiber—bulk crystalline amplifiers coupled to a non-linear frequency conversion unit to convert the laser pulses to the ultraviolet and visible spectral ranges.

23 Claims, 7 Drawing Sheets

ULTRAVIOLET FIBER LASER SYSTEM

CROSS REFERENCE TO RELATED APPLICATIONS

This application claims the benefit of U.S. Application No. 61/524,884 filed Aug. 18, 2011, and U.S. Application No. 61/524,436 filed Aug. 17, 2011.

BACKGROUND OF THE INVENTION

The invention relates generally to lasers and laser systems, and more particularly to fiber lasers operating in the ultraviolet (UV) spectral range.

Ultraviolet laser sources having high power and high pulse energy for short nanosecond pulse widths are required for many important applications such as laser material processing and medicine, e.g., eye surgery. Presently, these applications primarily use excimer gas lasers because of the lack of other suitable laser sources. Excimer lasers can produce laser emissions at several main wavelengths, such as nanometer (nm) wavelengths of 351 nm, 308 nm, 248 nm, 193 nm and 157 nm. While being reliable laser sources, excimer lasers are bulky, require periodic service and, therefore, can have high ongoing costs of ownership. In addition high power excimer lasers often exhibit poor beam quality, use high voltage electronics and have low wall plug efficiency.

Fiber lasers are a relatively new type of laser source that are capable of delivering laser emission in a wide spectral range from infrared (IR) to UV. Fiber lasers can operate in continuous wave (CW) to ultra-short pulse modes with output power levels exceeding tens of kilowatts (kW). Commercially available fiber lasers operate in pulse and CW regimes, and at fundamental operating frequencies with micrometer (μm) wavelengths in the 1 μm, 1.5 μm and 2 μm ranges. Nonlinear frequency conversion can be used to generate higher order harmonics and shorter wavelengths. One approach to obtaining UV spectral wavelengths in the 190-196 nm range has been to use a fiber laser operating at a fundamental wavelength in the 1.5 μm range and non-linearly convert the fundamental frequency to its $8^{th}$ harmonic. However, obtaining the desired average power level and pulse energy for nanosecond pulses in the higher harmonic spectral emissions has been a problem.

Several nonlinear optical effects, mainly Stimulated Brillouin Scattering (SBS), Stimulated Raman Scattering (SRS) and Self Phase Modulation (SPM), as well as the bulk optical damage in a fiber core limit the pulse energy of a fiber laser. The fiber laser pulse energy is usually restricted to a fraction of a millijoule (mJ) for nanosecond (ns) pulse widths and the pulse peak power is restricted to tens of kW.

This peak power limitation may be overcome using ultra short pulse generation in the picosecond (ps) and femtosecond (fs) ranges due to higher optical damage threshold of the glass fiber in these ranges of laser pulse width. Ultra short pulse, high peak power fiber lasers can generate high average powers with close to transform limited pulses. However, even for transform limited operation, the ultra short pulse fiber lasers have relatively broad spectral line widths (this is a basic quantum mechanics uncertainty principle). For example, a 1 ps transform limited Gaussian shaped optical pulse has approximately a 3 nm spectral line width at a 1.5 μm wavelength. This broad spectral bandwidth limits efficient nonlinear frequency conversion to higher optical harmonics. In addition increasing the ultra-short laser pulse energy significantly increases the already high peak power which, in turn, triggers the detrimental nonlinear optical effects that impact the fiber laser power scaling.

Thus, power and pulse energy scaling of a fiber laser is a challenging task, particularly when applications require close to diffraction limited beam quality, a pulse width less than 10 ns, tens of watts of average power, and a polarized beam. Scaling a fiber laser pulse energy in the visible and UV spectral range through nonlinear frequency conversion is likewise limited by the low available pulse energy of the fundamental wavelength. With sub-mJ pulse energy at a fundamental wavelength of 1 μm, the pulse energy in the $5^{th}$ or higher harmonics is of the order of a microjoule (μJ).

One approach to overcome these problems and scale the power and pulse energy to required levels in the UV range has been to use beam combining architectures (fiber bundling) that combines the outputs of several fiber laser sources to form a composite beam having increased average power and pulse energy with subsequent higher order nonlinear frequency conversion to the UV spectral range. For example, MOPA (master oscillator power amplifier) systems comprising erbium (Er) doped fibers synchronously seeded by the same master oscillator (MO) operating in the 1.5 μm range have been bundled to form a composite beam, and subsequently converted to the 193 nm spectral range. While fiber bundling can increase the pulse energy in the fundamental beam and high order harmonics, combining the outputs from bundled individual fiber lasers deteriorates the resulting laser beam and requires fine (nanosecond or sub-nanosecond) gating of the individual laser pulses to overlap. Additionally, the polarizations of the beams have to be aligned for efficient nonlinear harmonic generation which complicates spatial alignment of the individual fiber laser sources in the bundle. Another possibility is to combine multiple laser beams that have already been converted by the nonlinear frequency conversion to the UV range. However, this approach also requires several individual fiber laser sources, and is bulky, complicated and costly.

Other approaches to achieve UV fiber laser operation use optical frequency mixing of different pulsed MOPAs having different fundamental wavelengths, for example, one having a fundamental wavelength of 10YY nm and another having a fundamental wavelength of 15YY nm (or 21YY nm), to provide trains of optical pulses. The 10YY-nm pulses are frequency quintupled to a wavelength of 213 nm, and the 15YY nm (or 21YY nm) pulses are mixed with the 213 nm pulses to provide pulses having a wavelength of 193 nm. The 10YY nm and 21YY nm MOPAs include a fiber-laser and a bulk amplifier. However, this still requires two laser systems which need to be synchronized, properly triggered, and spatially overlapped in nonlinear crystals.

It is desirable to provide efficient power and energy scalable hybrid fiber laser/bulk crystalline solid-state amplifier systems capable of yielding a high pulse energy scalable to over 10 mJ, high average power scalable to over 100 W, output pulse widths controllable and variable from sub-ns to hundreds of ns pulse duration, and pulse repetition rates controllable from tens of Hz to over a MHz. It is to these ends that the present invention is directed.

SUMMARY OF THE INVENTION

The invention affords new laser systems, based on fiber laser technology and laser active crystalline materials, which provide laser emission lines close to the 193 nm and 248 nm spectral lines, power and pulse energy scaling with close to diffraction limited laser beam quality, reduced laser volume, improved laser efficiency, controlled pulse repetition rate, controlled pulse duration and reduced cost. Laser systems in accordance with the invention can replace excimer lasers.

In one aspect, the invention affords laser systems operating in the ultraviolet and visible light ranges that have high pulse energy, high average power, and controllable pulse width and pulse repetition rate by using a hybrid fiber-bulk master oscillator—power amplifier system comprising a low power seed laser and a hybrid fiber-bulk laser amplifier and subsequent nonlinear frequency conversion.

The invention further affords high power, pulsed, diffraction limited Ytterbium ($Yb^{3+}$) doped fiber lasers operating in the spectral vicinity of 980 nm which corresponds to the zero-phonon emission line of $Yb^{3+}$ in glass fiber between 972 nm and 985 nm in the near infrared spectral range, with subsequent pulse energy amplification using a matching crystalline laser amplifier and non-linear frequency conversion to the visible region between 486 nm to 492.5 nm, the UV region of 243 nm to 246.25 nm, and to the 194.4 nm to 197 nm spectral range.

The invention, in another aspect, affords a high power, pulsed diffraction limited $Er^{3+}$ doped or $Er^{3+}$—$Yb^{3+}$ doped fiber laser system operating in approximately the 1550 nm spectral range corresponding to the $Er^{3+}$ emission line in optical fiber glass between 1530 nm and 1610 nm in the near infrared region, with subsequent pulse energy amplification using a matching crystalline laser amplifier and non-linear frequency conversion to the 191.25 nm to 201.25 nm UV spectral range.

The invention, in yet a further aspect, affords high power, pulsed, diffraction limited Thulium ($Tm^{3+}$) doped fiber lasers system operating in the 2 μm spectral range which corresponds to the $Tm^{3+}$ emission line in optical fiber glass between about 1800 nm and 2150 nm in the near infrared with subsequent pulse energy amplification using a matching crystalline laser amplifier and non-linear frequency conversion to the 450 nm to 537.5 nm blue-green spectral range.

The invention, in still another aspect, affords simultaneous scaling of the laser pulse energy, and control of the laser pulse duration and the laser pulse repetition rate using a matched hybrid fiber—bulk laser crystalline amplifier comprising laser materials doped with an element selected from the group $Yb^{3+}$, $Er^{3+}$, $Er^{3+}$—$Yb^{3+}$, $Tm^{3+}$ and $Ho^{3+}$ (Holmium), and nonlinear frequency conversion of the amplified pulses to produce laser lines in the visible and UV spectral ranges.

Applications of laser systems in accordance with the invention include materials processing, laser communication, and laser medicine, especially for treatment of the eye.

DESCRIPTION OF PREFERRED EMBODIMENTS

The invention is particularly well adapted to providing high pulse energy, high average power, and controllable pulse width and repetition rate ultraviolet lasers for use in medical applications and the like, and will be described in that context. It will be appreciated, however, that this is illustrative of only one utility of the invention.

Figure 1:
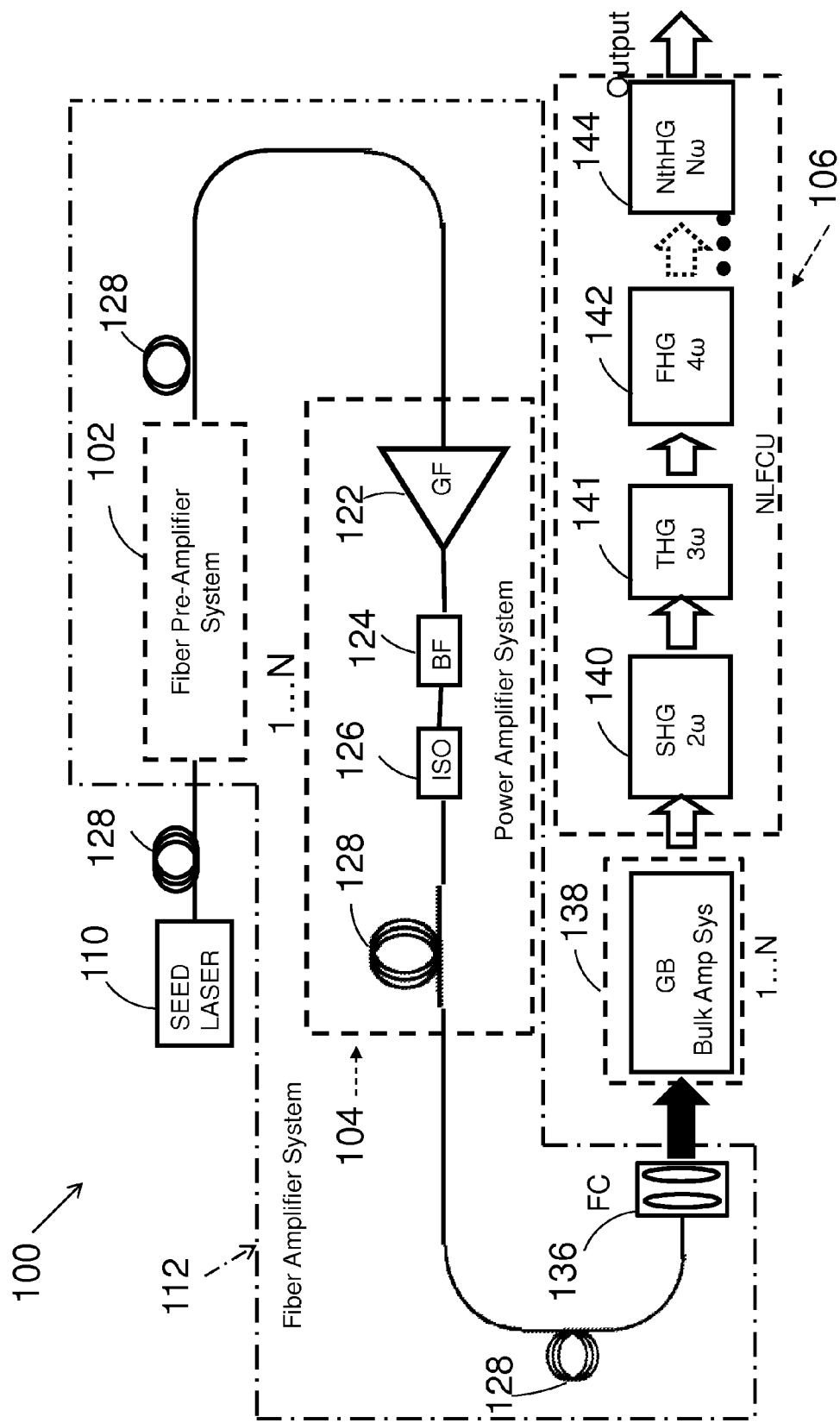
FIG. 1 is diagrammatic view of a generalized hybrid fiber-bulk laser system in accordance with an embodiment of the invention.

FIG. 1 illustrates a generalized fiber laser system 100 in accordance with the invention. As shown the system may comprise a single series connected chain comprising master oscillator (MO) 110 operating in a CW or pulse mode, a fiber amplifier system 112, and a bulk crystalline laser amplifier system 138 comprising one or more stages coupled to a non-linear frequency conversion unit (NLFCU) 106. Fiber amplifier system 112 may comprise a fiber laser pre-amplifier system 102 and a power amplifier (PA) system 104 which may comprise one or more amplifier stages. System 100 further comprises various optical system components which link the MO and individual sections of the PA including components for temporal and spectral shaping of the laser pulses, spatial mode matching, and optical isolation to protect the PA section from detrimental nonlinear effects created in other sections or from feedback of the external to the laser system optical components. Similarly, optical isolators 126 installed between power amplifier system 104 stages and bulk laser amplifier system 138 can be used to protect power amplifier system from back reflection originating from either focusing optics 136, bulk amplifier system 138 or nonlinear frequency conversion unit 106.

Figure 2:
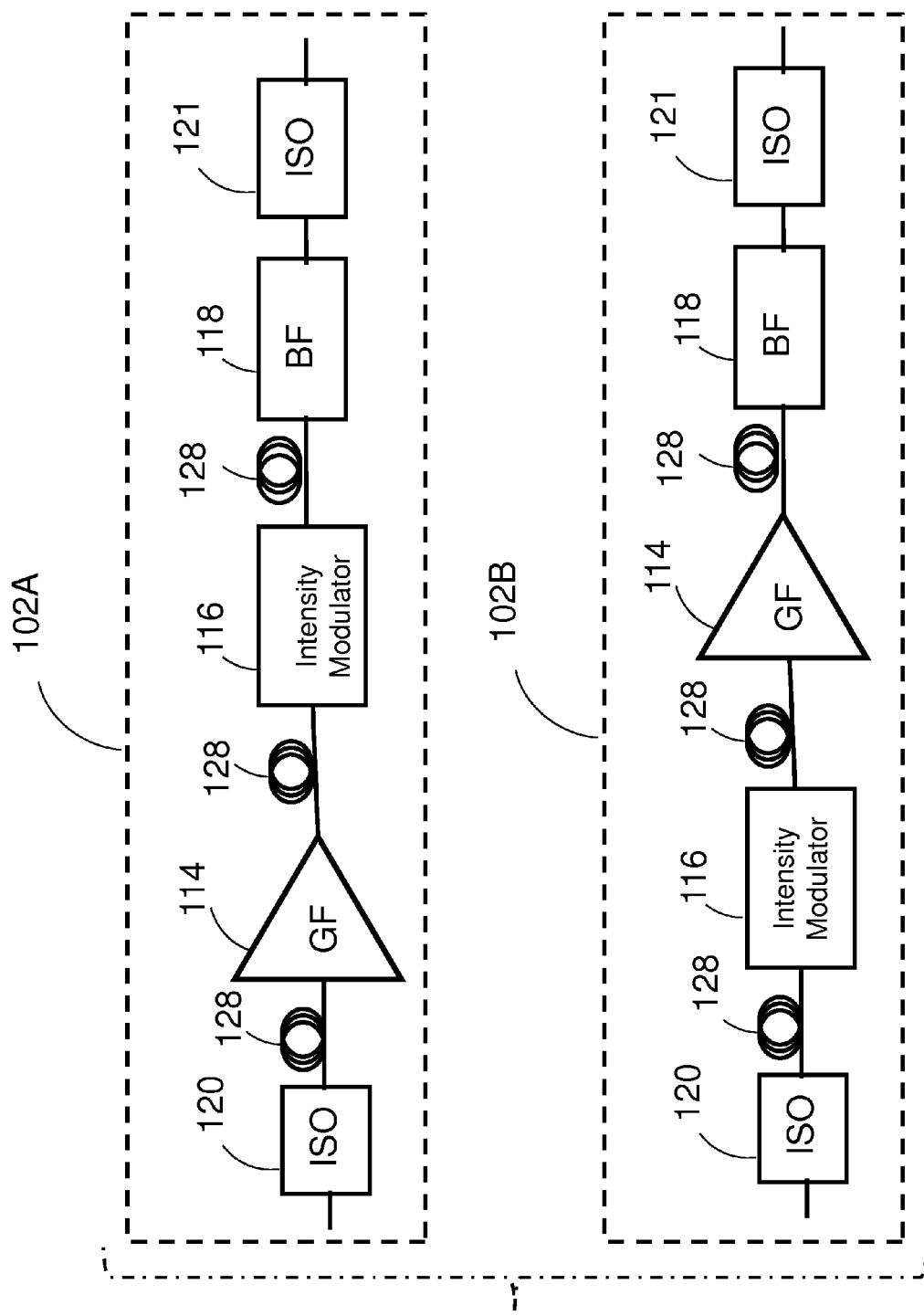
FIG. 2 is diagrammatic view of alternative embodiments of a fiber pre-amplifier system of FIG. 1 in accordance with an embodiment of the invention.

The master oscillator 110 may be coupled to the fiber pre-amplifier system 102, two embodiments of which (102A and 102B) are shown in FIG. 2. For a low power MO (optical power density out of the MO fiber core attenuated by the intensity modulator duty cycle is much less than the gain saturation intensity of the next fiber amplification stage) the invention may use fiber pre-amplifier system 102A, (FIG. 2), to amplify the MO emission before intensity modulation. As shown in FIG. 2, the fiber pre-amplifier 102A may comprise an isolator (ISO) 120 followed by a core or cladding pumped fiber pre-amplifier (GF) 114, an intensity modulator 116, a band pass filter (BF) 118 and optical isolator 121, connected in series. If the MO optical power is high (optical power density out of MO fiber core attenuated by the intensity modulator duty cycle is close to the gain saturation intensity of the next fiber amplification stage) the invention may use the embodiment of the fiber pre-amplifier system 102B as shown in FIG. 2 to amplify the MO emission after intensity modulation. The components of the fiber amplification stages are preferably coupled together by polarization maintaining (PM) optical fiber 128. The MO 110 may be either pulsed or continuous wave (CW) with a spectral emission band in the gain band of the fiber amplifiers 114, 122 and bulk laser amplifier 138. In the case of a pulsed MO 110, the intensity modulator 116 is not required.

The gain optical fiber used in the pre-amplifier 114 as a gain medium, may be of different types and structures, such as: (1) a polarization maintaining (PM) single clad, core-pumped $Yb^{3+}$, $Er^{3+}$, $Er^{3+}$—$Yb^{3+}$ or $Tm^{3+}$ doped glass fiber;

(2) a polarization maintaining (PM) cladding pumped large mode area (LMA) $Yb^{3+}$, $Er^{3+}$, $Er^{3+}$—$Yb^{3+}$ or $Tm^{3+}$ doped cladding pumped double clad (DC) or cladding pumped triple clad (TC) glass fiber. A LMA fiber is a fiber with a relatively large mode area core which supports a single transverse propagating mode or a few such modes. A LMA fiber may be produced by creating a core with a numerical aperture NA<0.1, i.e., a condition where the refractive index difference of the core and cladding is decreased (as in a step index fiber design) so that the core propagating mode fields penetrate into the cladding where their propagation loss increases with bending. This effect may be used to filter or attenuate high order spatial fiber modes by coiling the LMA fiber with a certain radius of curvature leaving only the fundamental propagation mode with close to diffraction limited beam quality. The typical core NA of the commercially available LMA fibers is in the range 0.06-0.08, and LMA fiber core diameters are typically of the order of 10-30 µm. SOA can also be used in the pre-amplifier stages.

Seed laser 110 may comprise one of the following types of single frequency (SF) MO lasers: a) any external cavity diode laser (ECL) which uses a diffraction grating as an output coupler and wavelength locker, external cavity diffraction grating based diode laser cavities in a Littrow or Littman configuration including tunable lasers, or a fiber Bragg grading (FBG) locked based diode laser or fiber laser; b) a distributed feedback diode laser (DFB); c) a distributed Bragg reflector diode laser (DBR); d) a fiber laser (FL) in either a linear or ring laser cavity or which employs distributed feedback; e) a microchip or other diode pumped solid state (DPSS) lasers with or without Q-switch and/or mode-lock modes of operation, or f) a semiconductor optical amplifier (SOA) based laser sources including linear or ring fiber coupled SOA based fiber lasers.

When a continuous wave (CW) MO is employed, the intensity modulator 116 may create optical pulses for subsequent amplification. The intensity modulator in this case may be, for example, a) an acousto-optical modulator (AOM); b) a Mach-Zehnder modulator (MZM) including small chirp or zero chirp modulators; c) an electro-optical modulator (EOM); or d) an attenuated total internal reflection modulator (ATIRM). A semiconductor optical amplifier (SOA) can also be used as a gain modulating device for a CW propagating beam in an SOA. An optical gain modulated SOA, in addition to creating pulses, may produce chirp free or reduced chirp pulse operation.

When a pulsed MO is desired, direct current modulation of the semiconductor laser output power may be employed using a pulse laser diode controller. In addition, current modulation of the diode laser can be used to create a mode-lock, Q-switch or hybrid Q-switch-mode-lock operation of the laser diode. Passively Q-switched, passively mode-locked (or a combination of both) DPSS lasers including microchip lasers and fiber lasers either based on ring or linear laser cavities may be used as a MO.

The MO 110 may be either a linear or ring laser cavity employing a single mode (SM), polarization maintaining (PM) or double clad (DC) SM or PM gain fiber. The gain fiber may be located inside a laser resonator comprising two or more mirrors, dispersive elements for wavelength selection/tuning, or just a closed loop of fibers and/or other optical components to create a ring laser cavity (including Q-switches and mode-locking devices).

The power amplifier system 104 can be a single or multi-stage CW or pulse pumped optical fiber amplifier (as shown in FIG. 1, for example) having an optical gain band overlapping the MO seed laser 110 spectral emission line. Each fiber power amplifier stage may comprise a core or cladding pumped amplifier 122, a band pass filter 124, an isolator 126 and an un-doped fiber 128, and is preferably separated by optical isolator 126 to protect a preceding amplification stage from power feedback originating in the next amplification stage. In the case of the first amplifier stage, isolator 120 at the input of the pre-amplifier 102A, 102B protects the MO 110 the isolator 121 at the output of the pre-amplifier 102A, 102B protects the fiber pre-amplifier system from back reflections. If fibers with different core diameters are used in the stages, mode field adapters (MFA) may be used to match mode sizes of neighboring amplifier stages.

Band pass filters BF 118, 124 (FIGS. 1 and 2) may be used to filter out amplified spontaneous emission (ASE) from a main laser spectral line to achieve higher spectral purity and reduce noise of the subsequently amplified laser beam. Typical ASE suppressing devices include dielectrically coated narrowband filters which are BF, Fabry-Perot etalons, acoustic-optical modulators and volume holographic filters based band-pass filters.

The optical gain fiber used in the power amplifier 122 as a gain medium, may be of different types and structures, such as: (1) a polarization maintaining (PM) single clad, core-pumped $Yb^{3+}$, $Er^{3+}$, $Er^{3+}$—$Yb^{3+}$ or $Tm^{3+}$ doped glass fiber; (2) a polarization maintaining (PM) cladding pumped large mode area (LMA) $Yb^{3+}$, $Er^{3+}$, $Er^{3+}$—$Yb^{3+}$ or $Tm^{3+}$ doped cladding pumped double clad (DC) or cladding pumped triple clad (TC) glass fiber. The optical gain fiber used in fiber amplifier 122 may also comprise any of: 1) a polarization maintaining (PM), i.e., single mode (non-LMA) $Yb^{3+}$, $Er^{3+}$, $Er^{3+}$—$Yb^{3+}$ or $Tm^{3+}$ doped cladding pumped double clad (DC) or cladding pumped triple clad (TC) glass fiber; (2) a polarization maintaining (PM) photonics crystal fiber (PCF) $Yb^{3+}$, $Er^{3+}$, $Er^{3+}$—$Yb^{3+}$ or $Tm^{3+}$ doped cladding pumped double clad (DC) fiber; (3) a polarization maintaining (PM) rod type photonics crystal fiber (RPCF) $Yb^{3+}$, $Er^{3+}$, $Er^{3+}$—$Yb^{3+}$ or $Tm^{3+}$ doped cladding pumped double clad (DC) fiber; or (4) a polarization maintaining (PM) rod type single crystal fiber (RSCF) $RE^{3+}$ doped gain fiber.

The optical gain fiber used in the power amplifier 122 is preferably heat sinked for heat removal. A heat sink may be formed of a cylindrically shaped component preferably made of a high thermal conductive metal such as, but not limited to, copper or aluminum (or other metals), having spiral grooves about its surface into which the fiber may be positioned and coiled about the cylinder. Additionally, a temperature gradient may be applied to the gain fiber coil to suppress stimulated Brillouin scattering (SBS) in the coiled fiber. Packaging of the fiber may also include thermally conductive semiconductor or dielectric materials such as but not limited to Si, alumina or ceramic.

When a LMA gain fiber is used in the fiber power amplifier, the fiber may be coiled to a certain radius of curvature to filter out higher order spatial modes propagating inside the fiber and to afford close to or diffraction limited light emission from the fiber. Spatial mode filtering may be implemented by using the heat conductive cylindrical heat sink (with active or passive heat removal) described above around which the fiber is coiled. The cylinder can act simultaneously as a both spatial mode filter and a heat sink.

To reduce chirp in propagating pulses, a chirped FBG or fiber coupled chirped volume holographic grating (VHG) may be included. Additionally, an inter-amplifier device such as a power coupler or directional coupler terminated with a photo-detector for power or pulse monitoring (not shown) may be included.

Optical power (or pulse energy in the case of pulse operation) entering each amplification stage is preferably brought to the level required for gain saturation in the amplifier for best power conversion efficiency (i.e., amplifier stored energy extraction efficiency) and reduced amplified spontaneous emission in the amplifier. This may be accomplished with additional pre-amplifier stages as well as multi-pass amplification geometries. Pre-amplification system 102 which may include an optical isolator 120 and band pass filter 118 may be used, for example, for pulsed laser operation (either using direct current modulation of the seed diode laser or CW seed laser output intensity modulation). Pulse operation reduces the average output power to a level depending on the pulse duty cycle. Reducing the average optical power of the pulsed MO may require using one or more pre-amplifier stages 102 (an intensity modulator is required only in one pre-amplifier stage) before the high power, i.e., booster fiber amplifier system 104.

The bulk crystalline laser amplifier 138 may be an excited laser gain crystal or a laser active crystalline ceramic having a net optical gain and a good overlap between the fiber laser fundamental wavelength and the bulk amplifier gain band (preferably corresponding to the maximum of the amplifier gain band or within full width half maximum (FWHM) of the band). The bulk amplifier may comprise laser active crystalline materials such as doped with trivalent rare-earth ($RE^{3+}$) elements or trivalent or tetravalent transition metals ($TM^{3+}$ or $TM^{4+}$) and is preferably pumped directly by laser diodes or diode pumped solid-state laser pumped another solid-state laser amplifier such as a $Ti^{3+}$:sapphire amplifier which can be pumped by a green DPSS laser. The bulk laser amplifier should match the MO and the fiber amplifier system. As used herein, matching means that the bulk amplifier comprises one or more laser active optically pumped crystal that a) have an optical gain which corresponds to spectral wavelength of the MO, b) the one or more laser active crystals together are capable of producing at least 0.5 mJ of pulse energy and at least 0.005 W of average power simultaneously, and c) operate in a pulse width range between 0.1 ns to 10,000 ns.

The bulk laser amplifier material should preferably have high energy storage capability, high thermal conductivity, high thermal shock tolerance and good thermo-optical properties to afford multi-watt to over a hundred of watts of output power. The crystalline laser amplifier may comprise a crystalline (including crystalline ceramic) rod, disk or slab shaped laser amplifier elements with un-doped parts diffusion bonded or optically contacted with the largest surfaces of the bulk amplifier active element. The diffusion bonded or optically contacted parts are used for wave-guiding and/or heat management purposes in the bulk amplifier. Possible materials for the diffusion bonded or optically contact parts are: un-doped version of the used bulk laser amplifier material, sapphire, YAG, Silicon, other semiconductor materials which demonstrate high thermal conductivity. High laser gain will allow the bulk amplifier to use a minimum number of amplification passes (ideally single or double pass amplification geometries) for efficient energy extraction.

High peak power pulses (or CW beam) exiting fiber amplifier 104 into the bulk solid state amplifier section 138 which may comprise 1 to N amplification stages get further coupled into the nonlinear frequency conversion unit (NLFCU) 106. Amplified in the bulk amplifier, the optical beam is coupled into a nonlinear crystal 140 for second order harmonic generation (SHG). The NLFCU may further comprise a second nonlinear crystal 141 for $3^{rd}$ order harmonic generation (THG), third nonlinear crystal 142 for $4^{th}$ order harmonic generation (FHG); and a nonlinear optical crystal or crystals 144 for NthHG, i.e., higher orders of frequency conversion in the UV spectral range. Mixing fundamental IR radiation with SHG beam in a nonlinear crystal 141 can create third order harmonic generation (THG), and fifth order harmonic generation (5HG) using another nonlinear crystal. Higher order optical harmonic generation (HG) may be achieved by further mixing of beams produced through different frequency conversion stages. In addition, individual stages of the NLFCU may include one or more mirrors, beam splitters, different prisms such as a Pellin Broca prism, and different types of diffraction gratings or optical filters to separate different laser spectral lines. The NLFCU may comprises a matching optical compensator prisms used in combination with an angle phase matched nonlinear crystals to preserve the initial beam axis direction after the nonlinear frequency conversion.

The nonlinear frequency conversion through second order harmonic generation (SHG) may be implemented using nonlinear optical crystals such as (but not limited to) periodically poled (i.e., PP) $MgO:LiNbO3$ (i.e., PPLN-MgO, i.e., doped with MgO), Periodically Poled Potassium Titanyl Phosphate (PPKTP), Periodically Poled Rubidium Titanyl Arsenate (PPRTA), Periodically Poled Lithium Niobate (PPLN), PPLN doped with other metal ions or their oxides for improving laser power tolerance (i.e., increasing damage/degradation or darkening threshold), periodically poled Lithium Tantalate (PPLT), periodically poled stoichiometric Lithium Tantalate (PPSLT), LBO and other critically and non-critically phase-patching nonlinear crystals.

The nonlinear frequency conversion through third, fourth or fifth order harmonic generation (THG, FHG or F5HG) can be implemented in different ways, including but not limited to periodically poled (i.e., PP) $MgO:LiNbO3$ (PPLN-MgO) crystals working in the first or higher order of poling period/grating, PPKTP, PPRTA, PPLN, PPLN doped with other metal ions or their oxides for improving laser power tolerance (i.e., increasing damage or darkening threshold), periodically poled Lithium Tantalate (PPLT), periodically poled stoichiometric Lithium Tantalate (PPSLT), MgO doped PPLT, MgO doped stoichiometric PPLT, PPLT doped with other metal ions or their oxides for improving laser power tolerance (i.e., increasing damage or darkening threshold), operating in the first or higher order of poling period/grating. Other nonlinear crystals can be used such as Potassium Dihydrogen Phosphate (KDP), Deuterated potassium dihydrogen phosphate (DKDP), Beta Barium Borate (BBO), Bismuth Triborate (BiBO), Cesium Lithium Borate (CLBO), Cesium Borate (CBO), Lithium Triborate (LBO) KBBF ($KBe_2BO_3F_2$), SBBO ($Sr_2Be_2BO_7$) etc., may be used.

In a preferred embodiment, the invention employs Yb-doped fiber lasers, and may use any Yb-doped fiber which demonstrates laser gain in the vicinity of the 980 nm emission band, i.e., the high energy luminescence band of the $^2F_{5/2} \rightarrow {}^2F_{7/2}$ optical transition of $Yb^{3+}$ in glass.

Figure 3:
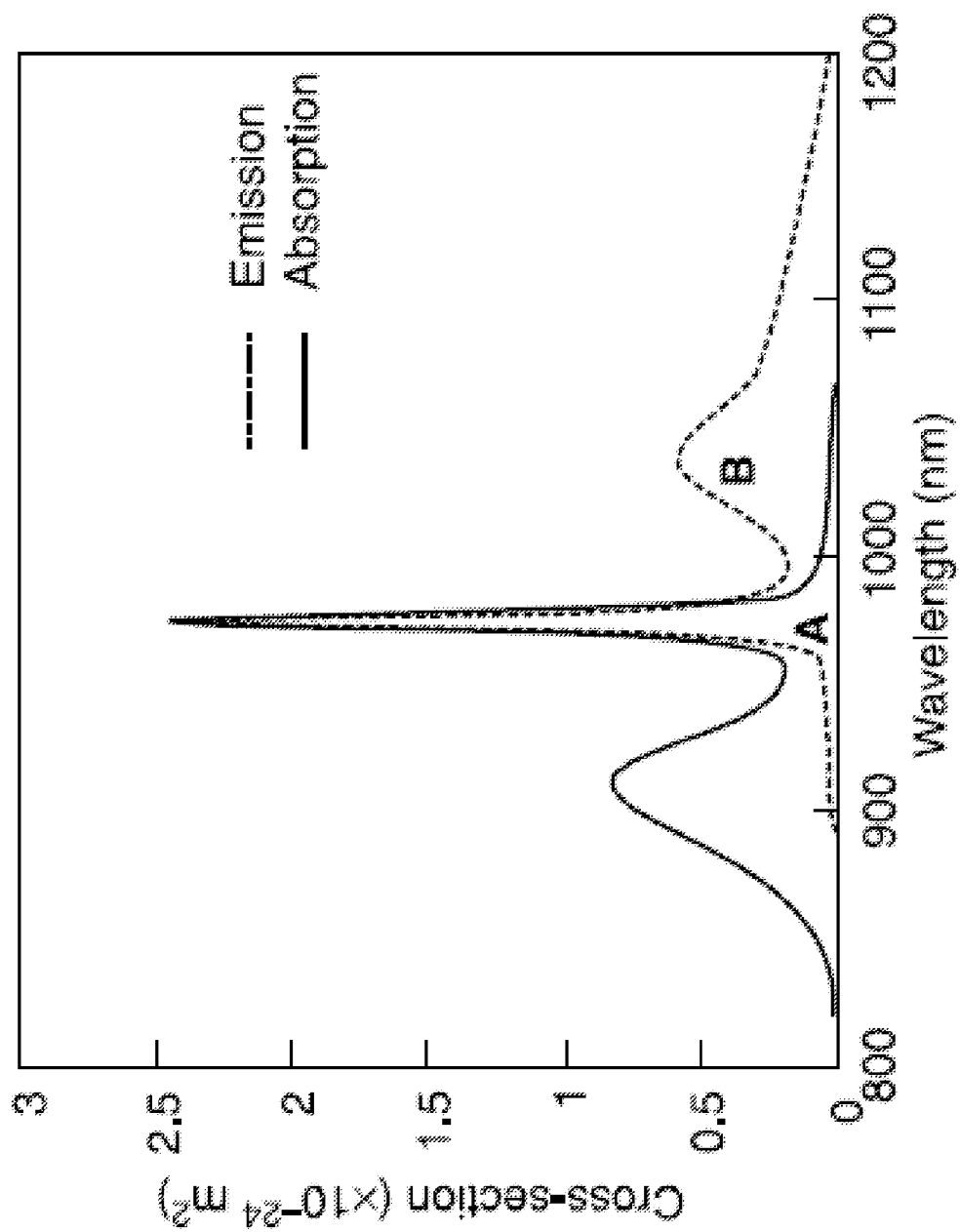
FIG. 3 illustrates the absorption and emission spectra of $Yb^{3+}$ in glass.

FIG. 3 illustrates the emission and absorption spectra for $Yb^{3+}$-doped glass. As shown, the highest absorption peak as well as the highest emission peak is A at 976 nm, and this wavelength is the most efficient pump light absorption for laser operation in the 1 μm spectral range. FIG. 3 also shows that $Yb^{3+}$-doped glass not only has a high level of absorption at the 976 nm zero-phonon line (ZPL), but also demonstrates strong emission at this wavelength with a high emission cross section. This has a dual impact on the optical and laser properties of $Yb^{3+}$-doped glass in the vicinity of its zero-phonon transition, i.e., near 976 nm. On one hand, laser action at 976 nm may be very intense, while on the other hand strong absorption, i.e., loss, at this same wavelength creates challenges in achieving population inversion and high net gain.

Pumping $Yb^{3+}$-doped glass fibers in a higher energy absorption part of the spectrum, i.e., at approximately 915 nm, produces strong luminescence in the 960-1100 nm spectral range. Pumping an $Yb^{3+}$ optical center in glass fiber near 915 nm and achieving laser emission in 1020-1100 nm spectral range is described very well by a quasi-four energy level mode of the laser operation. However, if the same $Yb^{3+}$ laser center in glass is pumped near a 915 nm wavelength but produces laser emission in the vicinity of the 976 nm wavelength, the laser operates on a quasi-three energy level scheme.

One of the biggest difficulties in achieving laser action in lasers having active centers which follow three-level operational scheme is that the laser medium, as a condition to achieving laser threshold, requires conversion of over half of its particles from ground energy level to an upper energy level. This is true for $Yb^{3+}$-doped fiber laser operation at 976 nm wavelength, i.e., at its zero-phonon line. The pump power requirement translates into higher laser threshold compared to four level lasers (such as $Yb^{3+}$ doped fiber lasers operating in 1020-1100 nm range) and requires higher pumping power density. Therefore, most efforts have been focused on core pumped a Yb-doped fiber laser operating in the spectral range of its ZPL near 976 nm using high brightness laser sources (single mode pump diode lasers, solid-state lasers or fiber lasers), because their radiation can be effectively coupled into the core of the gain fiber. This approach, however, is costly and has limited power scaling capability. Other approaches have included utilizing a photonics crystal Yb-doped gain fiber or pumping the Yb-doped gain fiber laser medium with a high power solid-state laser source (such as another fiber laser or diode-pumped solid-state laser), but they are complicated and costly. As will be described, the invention solves these problems using all glass Yb-doped fiber laser sources pumped by a low brightness diode lasers with nonlinear frequency conversion to the blue-green and UV spectral range allowing significant power scaling in the spectral vicinity of the ZPL of $Yb^{3+}$, making them attractive for important applications such as optical communication, material processing and medicine.

In one embodiment, the invention utilizes a fiber laser, either pulse or CW, based on $Yb^{3+}$-doped gain fibers which operates in a gain band in the vicinity of the $Yb^{3+}$ zero-phonon transition (ZPT) in the 960-1000 nm spectral range, (preferably 972-985 nm), as shown in FIG. 3. The fiber laser may operate on its fundamental frequency or, after nonlinear frequency conversion, in the visible and UV spectral range. Using a cladding pumped LMA Yb-doped fiber, the fiber glass core with a core area $S_{core}$ and a NA<0.1 may be surrounded by an un-doped, high NA (typically NA≥0.4) glass inner cladding with a cladding area $S_{clad}$.

The $S_{clad}$ to $S_{core}$ ratio of the fiber is chosen so that the optimum gain fiber length preferably satisfies the following conditions simultaneously: 1) more than 5% optical conversion efficiency from pump light typically in spectral range between 900 and 930 nm to an oscillating line typically in spectral range between 973-985 nm; 2) a ratio of the laser emission power in the spectral range 973-985 nm to the power of the laser oscillating in the spectral range 1010-1100 nm higher than one; 3) saturation of signal re-absorption transition under a given pump level and pumping geometry; 4) enough cladding optical absorption of $Yb^{3+}$ ions at the pumping wavelength to achieve a minimum number of loops of the coiled gain fiber in order to filter out higher order fiber spatial modes and leave the lowest spatial fiber propagating mode; and 5) allows cooling the gain fiber in the coiled gain fiber section if required at the given level of pump power. As described above, a metal cylinder about which the fiber is coiled may be used simultaneously as a mode filter and heat sink, and it may be either air cooled or attached to the Thermo-Electric Cooler (TEC) plate or water cooled heat sink. A triple clad (TC) gain fiber can also be used. The TC fiber is preferably a large mode area (LMA) one that has a Yb-doped core, i.e., a NA<0.1.

The Yb-doped core gain fiber preferably has the minimum possible $Yb^{3+}$ concentration (preferably less than 600 dB/m of the core absorption at 976 nm in the case of double clad $Yb^{3+}$-doped cladding pumped fiber) and minimum possible length, preferably to satisfy the following conditions simultaneously: a) because of the three energy level operation of the amplifier/laser, pumping each section of the fiber length is preferably implemented with enough pump power to saturate absorption of the active $Yb^{3+}$ centers at the oscillating wavelength to reduce re-absorption effects and losses to the laser radiation; and b) the fiber length is preferably be long enough to coil the LMA fiber (one or more loops) to filter out higher order spatial propagating modes and leave only the fundamental fiber propagating mode. Some LMA fibers like 10/125, $NA_{core}$=0.075, may not require coiling when used for guiding light with a wavelength close to 1 µm due to natural spatial mode filtering with a low NA core.

A Yb-doped fiber in accordance with the invention may be made of any type of polarization maintaining (PM) LMA fibers, e.g., including but not limited to Panda geometry, bow tie etc., or may be a true single transverse supporting mode LMA type fiber.

The Yb-doped DC or TC gain fiber (of any type listed above including a LMA) used either in the fiber amplifier or the pre-amplifier section of the system is preferably cladding pumped, i.e., the inner cladding of the fiber which surrounds the Yb-doped fiber core is optically pumped in the spectral range corresponding to the high energy absorption band of Yb in glass between about 900 and 940 nm depending on the glass type. Optical pump sources are preferably fiber coupled multimode, low brightness diode lasers. The optical pump power coupled into the cladding of the DC or TC Yb-doped fiber or coupled into the core of the single clad Yb-doped gain fiber should be high enough to create an optical power density sufficient to essentially reduce re-absorption loss (because of quasi three-energy level operation of Yb-doped gain fiber when it operates in the spectral range of its ZPL near 976 nm) for the seed light propagating inside the gain fiber core. The pump wavelength is preferably in the spectral range of 850 nm to 950 nm which corresponds to the high energy absorption band mentioned above.

The output end of the $Yb^{3+}$ fiber amplifier may be angle polished or angle cleaved to prevent back reflection of laser oscillation output from the fiber end, which can restrict power scaling of the fiber amplifier. The output end of the Yb fiber amplifier may also be end-capped to increase power tolerance of the output fiber end to the output amplifier beam when a non-end-capped fiber output restricts laser power scaling because of optical and thermal damage. End-capping comprises splicing a short length of a "coreless" fiber with the diameter usually close to the fiber cladding diameter to the end of the single mode, LMA or PM fiber. The end cap allows the light to expand in diameter before it emerges from the glass into air, reducing the power density at the glass/air interface. Because the glass/air interface is the most sensitive to damage, expanding the beam increases the damage threshold of the fiber end.

A Yb-doped DC LMA gain fiber that is cladding pumped in the 915 nm absorption band, (as described), may serve as an amplifier or a pre-amplifier stage of the master oscillator-power amplifier (MOPA) Yb-fiber laser system, when the original seed laser source is either a fiber laser operated in the spectral range between 973 nm and 985 nm or a diode laser (including PM and non-PM fiber coupled diode lasers) with oscillation wavelength in the spectral range between 973 nm and 985 nm, or in the gain bandwidth of the particular DC LMA Yb-doped fiber used. The seed laser of the MOPA system may be a single frequency DFB or any other single frequency diode laser. A single frequency solid-state microchip laser may also be used. For greater line-width operation, Fabry-Perot diode lasers, other solid-state lasers, or tunable fiber lasers may be used.

Unused pump radiation either transmitted through the gain fiber or not absorbed in it may be coupled out of the cladding by using index matching materials (with proper heat-sinking, if necessary) so that only amplified laser radiation is propagated out of the fiber LMA core. Commercially available power stripers can be used for this purpose.

A preferred configuration of a pump laser source comprises a 905-925 nm multimode fiber coupled, TEC free InGaAs laser diodes without wavelength stabilization. Using such multimode, wavelength stabilization free diodes as a pumping source for cladding pumping of the gain fiber is cost effective and affords power scalable for a high power Yb fiber laser operating at a fundamental wavelength around 980 nm and with subsequent nonlinear frequency conversion to the blue-green and UV spectral ranges. Other multimode fiber coupled diode lasers such as single diode bar coupled or single diode laser emitter coupled lasers can also be used as a pumping source, with or without wavelength stabilization.

Figure 4:
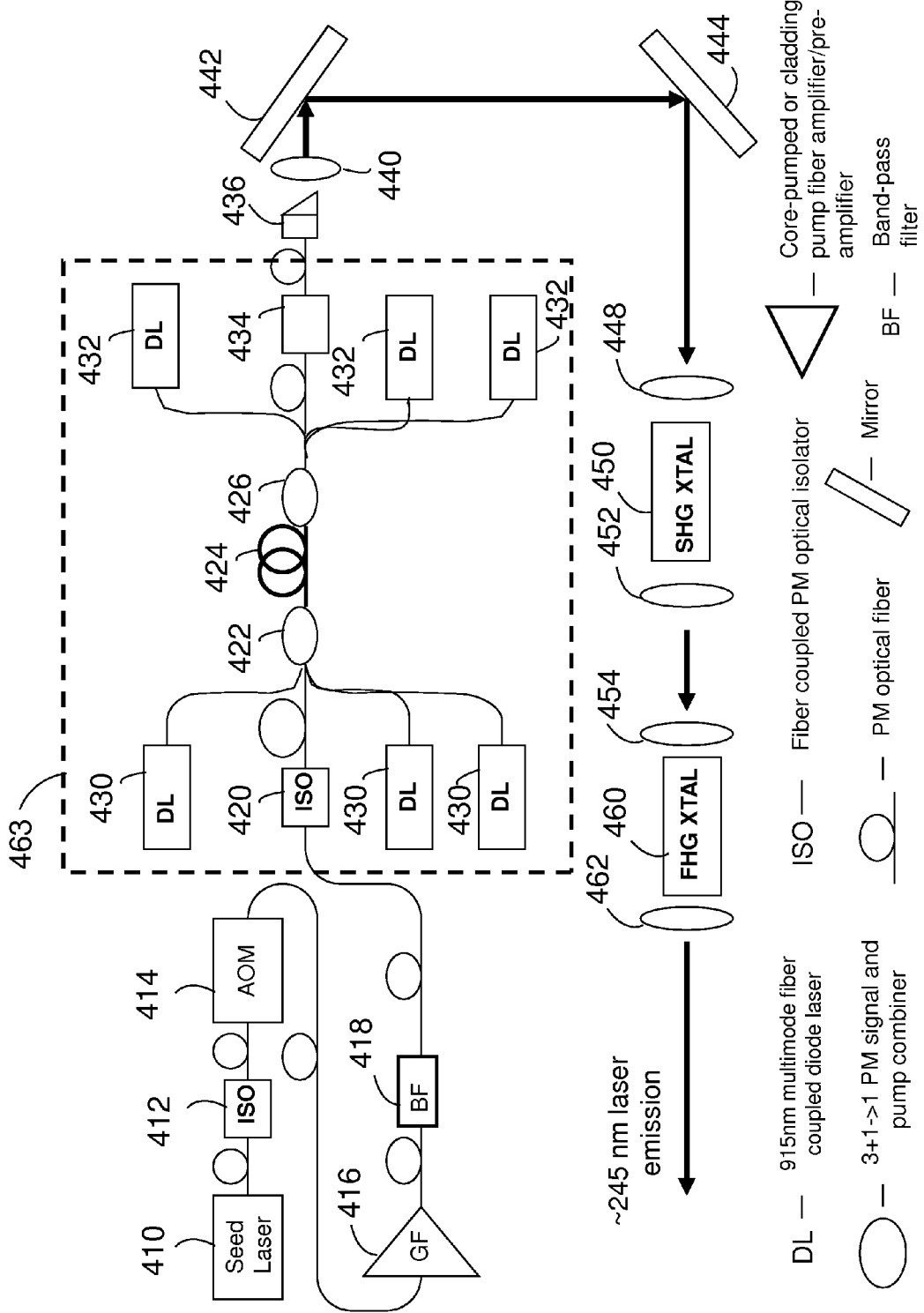
FIG. 4 is a diagrammatic view of a 245 nm fiber laser system in accordance with a second embodiment of the invention.

In a preferred amplifier configuration as shown in FIG. 4 and as will be described, a Yb-doped PM single clad or PM LMA DC gain fiber 424 may be cladding pumped in the 915 nm absorption band using co- and counter pumping geometries, i.e., when the pump light is coupled into the cladding either co-propagates with the seed light travelling in the core, counter propagates to the seed light travelling in the core or both co-propagates and counter propagates with the seed light simultaneously.

FIG. 4 illustrates a second embodiment of a laser system in accordance with the invention that effectively energy scales a 980 nm seed laser 410 by Yd-doped fiber amplifiers. The output of laser 410 may be connected, in series, to a fiber coupled isolator 412 (in addition any optical isolator that may be incorporated into the package of the fiber couple diode laser, i.e., between the diode laser chip and the optical fiber), an acoustic-optical modulator (AOM) 414 which produces optical pulses through intensity modulation, a core or cladding pumped fiber amplifier/pre-amplifier 416 to amplify low power pulses created by AOM 414 to the energy level close to the gain saturation of the booster amplifier 463, a band pass filter 418, and a second isolator 420 to a PM signal and pump combiner 422 (WDM or fused). The DC un-doped fiber of the PM pump and signal combiner 422 may be connected to a DC LMA Yb-doped double clad PM gain fiber 424 having an appropriately chosen length so that it may be coiled and heat sinked. The output of the Yb-doped gain fiber 424 may be coupled to another PM signal and pump combiner 426. The pump ports of the signal and pump combiners 422 and 426 may be coupled to a plurality of fiber coupled low brightness multimode diode laser (DL) sources 430, 432, respectively, with operating wavelengths near 915 nm in a co-pumped and counter pumped configuration for the Yd-doped gain fiber 424, as shown. The output from combiner 426 is connected to a fiber clad power stripper 434 to remove any remaining part of the pump power propagating in the fiber cladding. The output end of the Yb-doped gain fiber is preferably end-capped, angle cleaved or polished as shown at 436, preferably with more than 8 degrees between the polished surface and the direction of the core propagating light. The amplified 980 nm output of the fiber may then be coupled to a collimating lens 440 and directed by mirrors 442 and 444 to another lens 448 and to a second harmonic generator (SHG) crystal 450. The 490 nm second harmonic light from SHG crystal 450 may be directed through lenses 452, 454 to a fourth harmonic generator (FHG) crystal 460. Another lens 462 may collimate the 245 nm fourth harmonic light exiting the FHG crystal 460. In accordance with the invention, a powerful 980 nm DFB PM fiber coupled diode laser 410 may be temperature tuned to the 978 nm spectral position, then spliced to the PM fiber isolator 412 which, in turn, may be spliced directly to the input signal port of the fused PM pump to signal combiner 422. A PM, LMA Yb-doped DC fiber 424 can be used as a gain medium for fiber booster amplifier 463.

In accordance with the invention a preferred laser configuration that may be used for high power operation is as follows. The seed laser 410 may comprise a 980 nm single frequency PM fiber coupled (PM980 fiber which is a 6/125 PM panda fiber) diode laser temperature tuned to 978 nm, coupled to the fiber coupled 980 nm PM isolator 412 followed by tapered mode field adapter with PM-6/125 fiber at the input port and PM-LMA 25/250 fiber at the output port and to the input signal port of the pump to signal combiner 422. Combiners 422 and 426 may each be a fused PM pump to signal 3+1→1 (3×200/220, NA=0.22 pump ports and 1×PM-LMA-DC-25/250 through signal port) combiner. The pump lasers 430, 432 may be 915 nm diode lasers. The total pump power from the three fiber coupled pump diode lasers 430 is preferably 300 W (100 W from each fiber coupled 915 nm diode laser 430). The Yb-doped booster amplifier gain fiber 424 may comprise approximately 50 cm-100 cm of Yb-doped DC fiber with a 25 μm core diameter, a 250 μm cladding and between 4 dB/m and 6 dB/m clad absorption at 976 nm wavelength having a 20 degree cleaved output end and coiled about an aluminum cylindrical heat sink with a coiling diameter between approximately 40 mm and 60 mm. The coiled fiber also acts as a high order waveguide spatial mode filter. With a minimum conversion efficiency of 10%, the Yb fiber laser and amplifier configuration should produce an output of over 30 W of 978 nm radiation to a 2 cm long PPLT nonlinear crystal 450 located between the two lenses 448, 452 for focusing and re-collimation of the laser beam. With about 0.3%/W/cm conversion efficiency of the PPLT, which should produce about 18% conversion efficiency from a 30 W, 978 nm fiber laser, the system can deliver approximately 5.4 W of 489 nm blue-green laser line with subsequent nonlinear frequency conversion to the UV spectral range.

Amplifier/pre-amplifier 416 may be an Yb-doped fiber amplifier or a side pumped DPSS microchip amplifier. Examples, are microchip PM fiber coupled amplifiers based on Yb-doped yttrium vanadate (Yb:YVO4); Yb-doped gadolinium vanadate (Yb:GdVO4); Yb-doped potassium gadolinium tungstate (Yb:KGW); Yb-doped potassium yttrium tungstate (Yb:KYW) Such microchip amplifiers advantageously reduce cost while boosting peak power, which is not possible to achieve using a SOA.

A fiber coupled microchip laser used as a seed laser 410 in accordance with the invention may comprise a Nd:YVO4 (or Nd:GdVO4) crystal optically bonded to Yb:KYW (or Yb:KGW) with a laser cavity mirror, i.e., dichroic high reflector at about 980 nm and 912 nm (or 914 nm as in the case of the Nd:GdVO4 crystal) and high transmitter at about 808 nm created on the Nd:YVO4 (or Nd:GdVO4) crystal. Another mirror for an output coupler may be created on the Yb:KYW (or Yb:KGW) crystal with partial transmission at 980 nm and high reflection at 912 (or 914 nm as in the case of the Nd:GdVO4 crystal). The Nd:YVO4 (or Nd:GdVO4) crystal may be optically pumped by a 808 nm diode laser (either internal grating stabilized, VBG stabilized or a non-stabilized), producing intra-cavity laser emission at 912 nm (or 914 nm as in the case of the Nd:GdVO4 crystal) which circulate inside the microchip laser resonator. The Nd laser operates a 4F3/2→4I9/2 transition with 912 nm (or 914 nm) laser wavelength and produces intra-cavity circulating power which in turn intra-cavity optically pumps the Yb:KYW (or Yb:KGW) laser crystal, producing ZPL laser emission of these laser crystals at 980 nm through the output coupler. In addition to the Nd:YVO4 (or NdYGdVO4) and Yb:KYW (or Yb:KGW), a nonlinear crystal, preferably quasi-phase matched (such as PPLN-MgO) may be inserted into the microchip laser cavity through optical contact to the Yb:KYW (or Yb:KGW) crystal (or though free space). The laser may produce blue-green laser power in the vicinity of approximately a 490 nm spectral line, in which case microchip laser cavity mirrors may be deposited on the Nd crystal and the nonlinear crystal. A TEC can be used for thermal management of the microchip laser.

Figure 5:
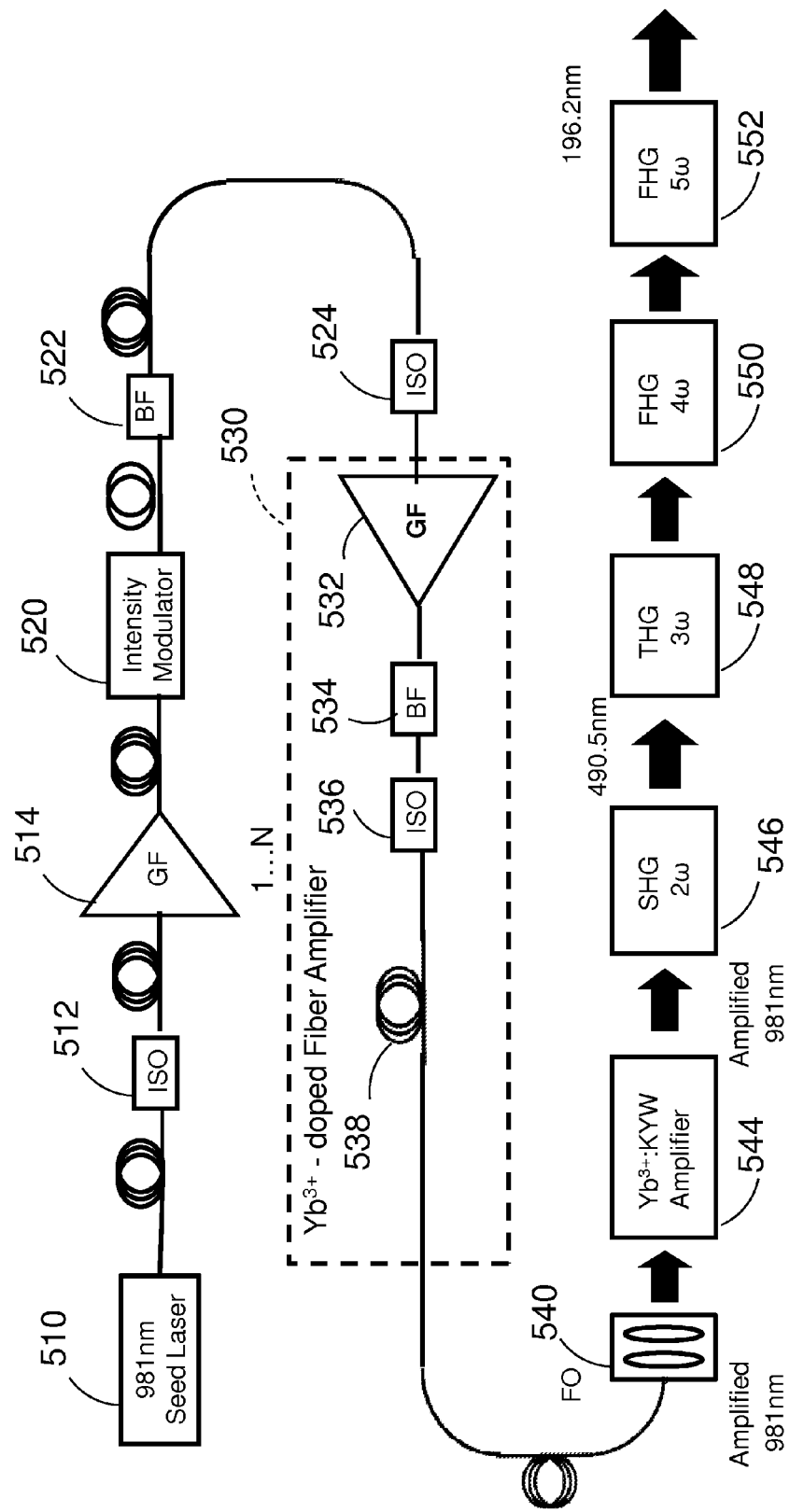
FIG. 5 is a diagrammatic view of a 196.2 nm hybrid fiber-bulk laser system in accordance with a third embodiment of the invention.

FIG. 5 illustrates a third embodiment of the invention in which a DFB, 100 mW, PM fiber coupled diode laser 510 operating at 981 nm wavelength is used as a CW seed laser for the master oscillator. The 981 nm laser output may be supplied, in series, to an isolator 512, an amplifier/pre-amplifier 514, and an intensity modulator 520 which may comprise a PM fiber coupled small chirp or chirp-free electro-optical Mach-Zhender modulator producing 1 ns pulses at a 1000 Hz pulse repetition rate (PRR) (i.e., a duty cycle of 0.000001). With a 4 dB insertion loss, about 40 nW of the 981 nm light average output power may be obtained from the Mach-Zhender modulator 520. The output from the intensity modulator may be applied to a band pass filter 522, an isolator 524, and to a single or multi stage $Yb^{3+}$-doped fiber booster amplifier 530. Elements 532, 534, 536 and 538 may be similar to elements 122, 124, 126 and 128 previously described in connection with FIG. 1. A core-pumped or a cladding pumped Yb-doped fiber amplifier 538 operating on the zero-phonon transition line of $Yb^{3+}$ in LMA Yb-doped fiber and acting as a last stage fiber amplifier booster may be used to boost the pulse energy to a level of 10-20 μJ (0.01 W-0.02 W of average power at a 1 kHz PRR). The resulting peak power of the 981 nm pulses may be on the order of 20 kW. Such high peak power limits further successful amplification of the laser pulses in a Yb-doped fiber amplifier due to the detrimental nonlinear processes previously described.

In order to boost the laser pulse energy further, the output from the Yb-doped fiber amplifier 530 may be focused or collimated using an optical system 540 and supplied to a solid-state bulk crystalline laser amplifier 544 with relatively low gain saturation energy. A $Yb^{3+}$:KYW crystal has relatively good thermo-optical, mechanical and laser properties, and is a good candidate for the solid state bulk amplifier 544. The solid state bulk laser amplifier 544 may comprise a single or multi-stage diode-pumped $Yb^{3+}$:KYW amplifier pumped by 915 nm, 450 mJ diode lasers. The amplified 981 nm laser pulses from the amplifier at the maximum of the zero-phonon $Yb^{3+}$:KYW gain band may have a pulse energy of 45 mJ per pulse. For transform limited pulse amplification, the $Yb^{3+}$:KYW amplifier can produce a pulse peak power of 45 MW at 981 nm with less than 1 GHz spectral width (<0.002 nm). The amplified 981 nm laser pulses from amplifier 544 may be frequency converted to 196.2 nm in a fifth nonlinear harmonic generation process 1ω+4ω→5ω using second harmonic 546, third harmonic 548, fourth harmonic 550 and fifth harmonic 552 generators. A pulse energy of about 5 mJ may be obtained for the 196.2 nm laser pulses. Focusing of a 5 mJ laser pulse to a round spot with a spot diameter of the order of 50 μm gives a pulse energy density of approximately 250 J/cm$^2$.

In another embodiment a diode laser pumped Chromium ($Cr^{3+}$)-doped $LaSc_3(BO3)_4$ ($Cr^{3+}$:LSB) laser crystal can be used as a bulk pulse energy booster amplifier 138 (FIG. 1), 544 of the Yb-doped fiber laser MOPA operating at 980 nm. This laser crystal has optical gain near 980 nm and can be directly optically pumped by red diode lasers.

In fourth embodiment the invention affords pulse and CW operation of Er fiber lasers based on LMA, DC $Er^{3+}$-doped gain fibers optically cladding pumped either resonantly into a 1530 nm absorption band or a 976 nm absorption band of $Er^{3+}$. The gain band of $Er^{3+}$-doped fibers spans from approximately 1530 nm to over 1600 nm. The approach described above for Yb-doped fiber laser may also be used for laser power scaling with close to diffraction limited laser beam quality when an $Er^{3+}$-doped LMA fiber is used (with appropriate selection of MO wavelength and spectral properties of all other system components, appropriate for an $Er^{3+}$ fiber laser). This enables pulse and CW laser operation at virtually any laser line in the 1530-1610 nm spectral range as well as for red and UV operation of these lasers via nonlinear frequency conversion to higher harmonics of their fundamental frequencies.

Figure 6:
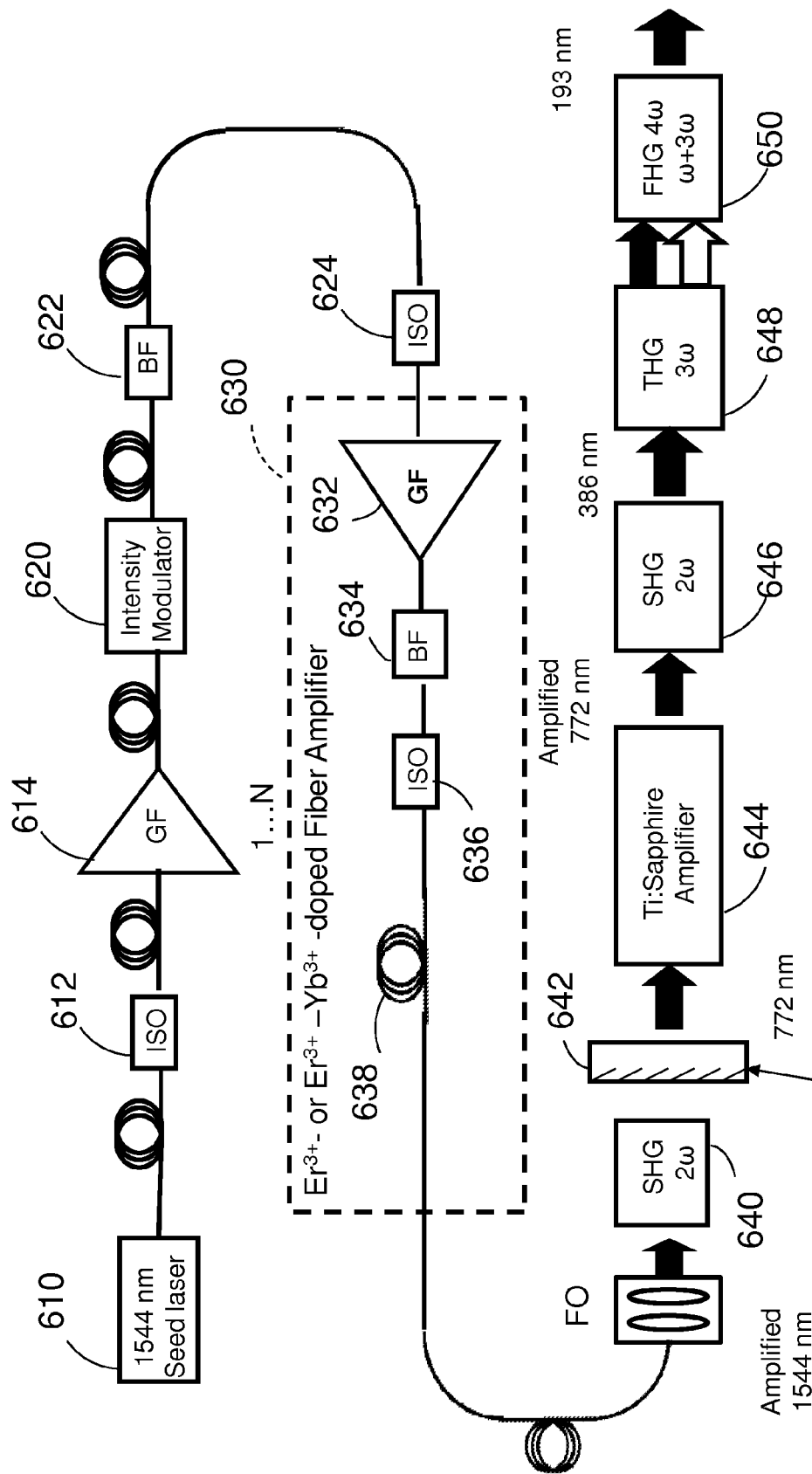
FIG. 6 is a diagrammatic view of a 193 nm hybrid fiber-bulk laser system in accordance with a fourth embodiment of the invention.

FIG. 6 illustrates the fourth embodiment of the invention that has an overall configuration similar to that described for the third embodiment of FIG. 5. The fourth embodiment of FIG. 6 may use a fiber coupled DFB diode laser as a seed laser 610 with an operating wavelength of 1544 nm instead of a 981 nm diode laser 510. The output of the laser 610 may be coupled to a fiber coupled isolator 612 (in addition or instead of the optical isolator incorporated into the package of the fiber couple diode laser, i.e., between the diode laser chip and the optical fiber) and then injected into the fiber Er-doped pre-amplifier 614 comprising a pump diode laser, a pump and signal fiber combiner (WDM or fused) and Er-doped or an $Er^{3+}$—$Yb^{3+}$-doped gain fiber. The light at the output of the pre-amplifier 614 may be then coupled to an intensity modulator 620 which may be a Mach-Zhender modulator such as 520 described above, to a band pass filter 622, an isolator 624 and to a single or multi-stage $Er^{3+}$-doped or an $Er^{3+}$—$Yb^{3+}$-doped fiber booster amplifier section 630. Each stage of amplifier 630 may comprise an amplifier 632, a band pass filter 634, an isolator 636 and an un-doped fiber 638. The band-pass filter 634 filters out residual ASE signal which may be present in the output of the fiber amplifier 632 and optical isolator 636 protects the fiber amplifier 632 from power feedback originating in the next amplification stage. The DC un-doped output fiber of the pump and signal combiner (which is a part of the fiber amplifier 632) may be spliced to the DC LMA $Er^{3+}$-doped or an $Er^{3+}$—$Yb^{3+}$-doped gain fiber having an appropriately chosen length (an example is PM version of Liekki Er120-20/125 LMA DC $Er^{3+}$-doped fiber). The pump ports of the pump combiner may be spliced to the fiber coupled low brightness, multimode diode lasers with oscillation wavelengths near 976 nm which radiation is coupled into the cladding of the Er-doped DC gain fiber using pump power combiner. The output end of the $Er^{3+}$-doped cladding pumped gain fiber is preferably end-capped and angle cleaved or polished with more than 8 degrees between the polished surface and the direction of the core propagating light. Fifth harmonic generation of the fundamental 1540 nm fiber laser wavelength affords a 308 nm UV laser line which corresponds to the 308 nm line of an excimer laser.

Obtaining a low core NA is much more difficult in Er—Yb-doped fibers than in Er-doped fiber alone due to the high phosphorous concentration required for pump transfer in the $Yb^{3+} \rightarrow Er^{3+}$ case. Therefore, most commercial Er-doped fibers are either Er—Yb co-doped with a single mode core (SM or PM) and high core NA (over 0.1) or just Er-doped in a LMA structure with core NA<0.1

Using a single laser source with a minimum number of nonlinear frequency conversion stages (no other resonant cavities such as OPO or resonant cavity harmonic generation) in the case of an Erbium doped fiber laser, i.e., at a single laser wavelength in the range of approximately 1530-1570 nm, the bulk solid-state crystalline laser amplifier 138 (FIG. 1) should have a laser gain in the vicinity of 1550 nm. Most widely used highly thermally conductive laser crystals such as $Er^{3+}$:YAG, $Er^{3+}$:YVO$_4$ or $Er^{3+}$:GdVO$_4$ demonstrate gain in approximately the 1.6 μm spectral range, i.e., shifted to the longer wavelength range of the optical spectrum from 1.5 μm or favor 2.9 μm transition of $Er^{3+}$ ($^4I_{11/2} \rightarrow {}^4I_{13/2}$) and demonstrate low efficiency in 1.5 μm lines. Therefore, these crystals are not well suited, i.e., they are not spectrally matched, for the efficient amplification of a 1.5 μm laser line. This is a main reason why there is a lack of high pulse energy and high average power solid-state lasers in the vicinity of the 1.5 μm other than bulk $Er^{3+}$-doped glass amplifiers. These amplifiers afford high energy amplification, but because of the low thermal conductivity of glass, they are restricted to a few hundreds of mW of average output power.

Laser sources in accordance with the invention address this in two ways. One approach is to use $Er^{3+}$— or $Er^{3+}$—$Yb^{3+}$ doped crystalline laser materials such as $Er^{3+}$:KYW or $Er^{3+}$—$Yb^{3+}$:KYW laser crystal which have a gain band that spans approximately 1530 nm to 1600 nm with a center near approximately 1.55 μm. These crystals can be diode laser pumped with commercially available InGaAs laser diodes operating in 905-980 nm spectral range, which are one of the most reliable and efficient class of laser diodes.

A second approach is to use a sequence of optical amplification and nonlinear frequency conversion stages to achieve high energy, high repetition rate and high average power UV laser light. As shown in FIG. 6, the first fiber laser amplifier 614 amplifies the 1544 nm laser beam produced by the seed laser 610. After intensity modulation by modulator 620, the booster amplifier system 630 amplifies the laser pulses further. The amplified laser pulses are then frequency converted using the SHG generator 640 to the red line at 772 nm. Second harmonic generation in the 1544 nm spectral range to produce 772 nm light can be achieved either using phase matched or quasi-phase matched nonlinear materials, and can achieve a conversion efficiency of over 50%. Next, prior to further nonlinear frequency conversion, as shown in FIG. 6, a laser bulk solid-state amplifier 644 may be used after filtering the 1544 nm fundamental beam at 642 to boost the pulse energy of the 772 nm light. Subsequently, the amplified 772 nm laser pulses may be nonlinearly frequency converted in second, third and fourth harmonic generators 646, 648 and 650 to 193 nm. Preferred laser crystals for amplifier 644 are $Ti^{3+}$:sapphire or Alexandrite. Other crystals such as $Cr^{3+}$:LiCAF can also be used, but they have limited output average power capability. Both of these materials have a maximum of the gain near 770 nm and can be laser pumped or diode pumped. Most importantly, both $Ti^{3+}$:sapphire and Alexandrite have high thermal conductivity and can operate in a high average power mode. Additionally, a $Ti^{3+}$:sapphire laser amplifier can be pumped by reliable and available DPSS green lasers or by blue laser diodes. For both high pulse energy and high repetition rate, there are commercially available systems with pulse energy of over 30 mJ at 527 nm and pulse repletion rate of 1 kHz. A 45 mJ, 527 nm, DPSS laser pumped $Ti^{3+}$:sapphire crystal used as a booster amplifier for 772 nm can produce at least 4 mJ of pulse energy. With subsequent frequency conversion to the second, third and finally fourth harmonics, a laser source in accordance with the invention can produce a pulse energy of over 0.5 mJ at 193 nm. When this 0.5 mJ pulse energy is focused to a round spot with the diameter of 0.65 mm, the energy density will be 150 mJ/cm$^2$, which is what most LASIK eye systems require from a laser source to be delivered to the cornea target.

In one embodiment, seed laser 610 may be a DFB, 100 mW, PM fiber coupled diode laser operating at 1544 nm wavelength as a CW master oscillator. The 1544 nm laser light intensity may be modulated in intensity modulator 620 comprising a PM fiber coupled small chirp or chirp free electro-optical Mach-Zhender modulator producing 1 ns pulses at 1000 Hz pulse repetition rate (PRR) (i.e., duty cycle of $10^{-6}$). With a 4 dB insertion loss, about 40 nW of the average output power may be obtained at the output of the Mach-Zhender modulator. A core or cladding pumped Er-doped fiber power amplifier 630 may be used to boost the pulse energy to the level of 10-20 μJ (0.01 W-0.02 W of average power at 1 kHz PRR). The resulting peak power of the 1544 nm pulses will be on the order of 20 kW. This high peak power limits further successful amplification of the laser pulses in an Er-doped fiber amplifier due to detrimental nonlinear processes. In order to boost further the laser pulse energy, a solid-state bulk laser amplifier with relatively low gain saturation energy is used. Ti:sapphire has a very good thermo-optical, mechanical and laser properties and is a good candidate for the task to boost the laser pulse energy. To convert the 1544 nm laser wavelength to one to match the Ti:sapphire amplifier gain band, the SHG 640 may use a MgO:PPLN nonlinear crystal to convert the 1544 nm wavelength to 772 nm. With a typical conversion efficiency for >1 kW pulse peak power of 40-50%, approximately 100 mW average power at 772 nm can be obtained. To boost the laser pulse energy the 772 nm pulses may then be amplified in a single or multi-stage Ti:sapphire amplifier pumped by a 527 nm, 45 mJ diode-pumped Nd:YLF laser. Dual or multi-pass amplification geometries can be used to increase the Ti:sapphire amplifier energy extraction efficiency. The amplified 772 nm laser pulses may reach a level of 10 mJ per pulse. For transform limited pulse amplification, the Ti:sapphire amplifier booster 644 can produce a pulse peak power of 10 MW at 772 nm with less than 1 GHz spectral width (<0.002 nm). The three harmonic generators 646, 648 and 650 that convert 772 nm to 193 nm may use a set of three BBO nonlinear crystals. The 193 nm laser pulse energy will be approximately 1 mJ, which when focused to a round spot diameter of 0.8 mm affords a pulse energy density of about 200 mJ/cm$^2$.

In another embodiment, a core-pumped or cladding pumped Er-doped fiber pre-amplifier may be used to boost the pulse energy to the level of 10-20 μJ (0.01 W-0.02 W of average power at 1 kHz PRR). Subsequently, a solid-state bulk laser amplifier with relatively low gain saturation energy, preferably diode-pumped $Er^{3+}$—$Yb^{3+}$:KYW crystal having moderate thermo-optical, mechanical and laser properties may be used to boost the 1544 nm laser pulse energy. The gain band of the $Er^{3+}$—$Yb^{3+}$:KYW crystal overlaps the 1544 nm laser line. Also, this laser crystal can be directly diode-pumped with 980 nm InGaAs laser diodes. This bulk laser amplifier can boost the fiber laser pulse energy to the level of over 20 mJ. Subsequent nonlinear frequency conversion of the fundamental frequency of this hybrid laser system affords UV laser pulses at 193 nm wavelength ($8^{th}$ harmonic generation from 1544 nm fundamental beam) with overall energy conversion efficiency over 5%. The expected pulse energy of the 193 nm laser pulses is close to 1 mJ, and with focusing to a round spot diameter of 0.8 mm achieves a pulse energy density of about 200 mJ/cm$^2$.

Figure 7:
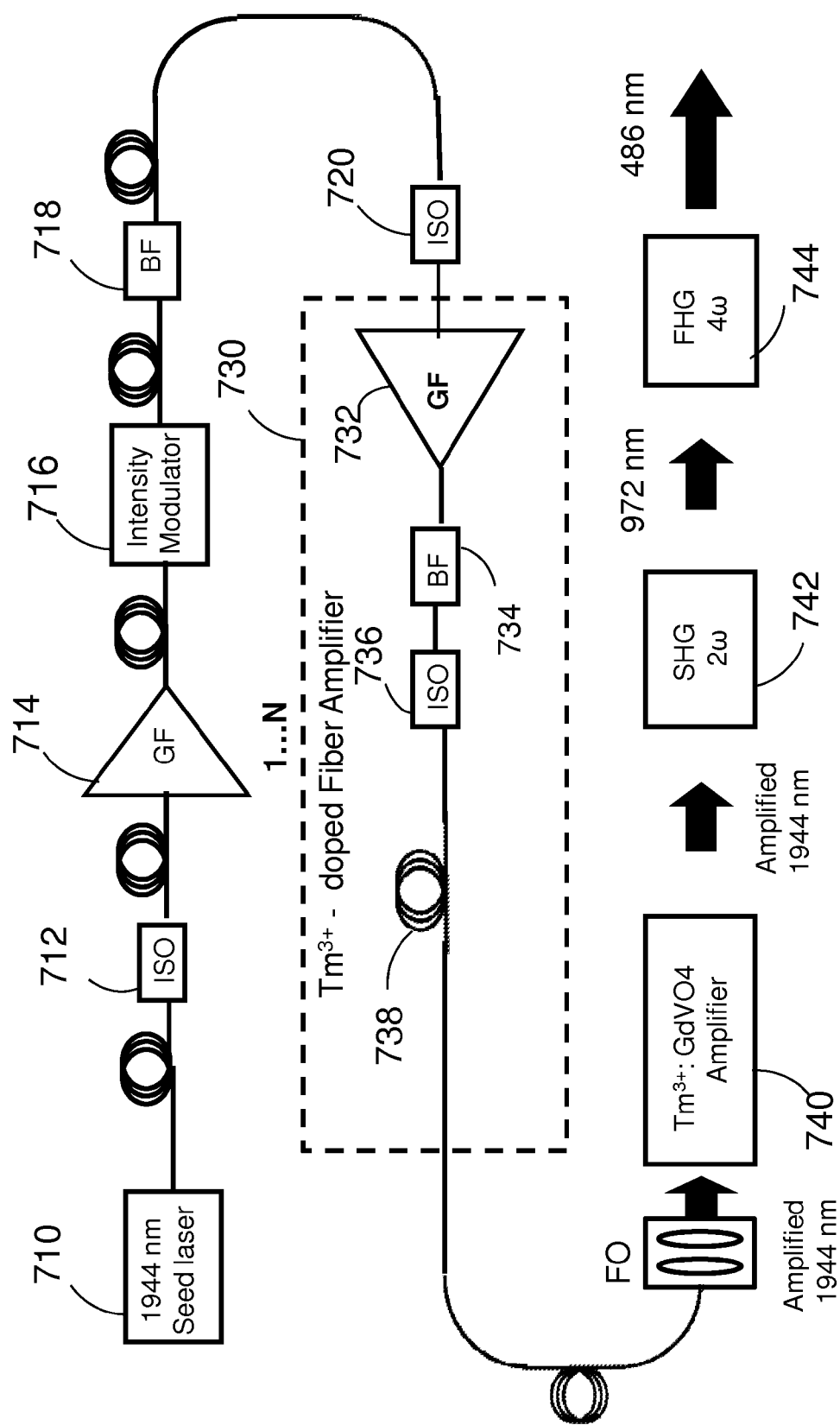
FIG. 7 is a diagrammatic view of a 486 nm hybrid fiber-bulk laser system in accordance with a fifth embodiment of the invention.

In a fifth embodiment shown in FIG. 7, a laser source in accordance with the invention may use pulse and CW operation of Tm$^{3+}$ fiber lasers based on LMA, DC Tm$^{3+}$-doped gain fibers optically cladding pumped either resonantly into the 1650 nm absorption band or the 795 nm absorption band of Tm$^{3+}$-doped glass. The gain band of Tm$^{3+}$ doped fibers is approximately 1850 nm to over 2100 nm. The approach of the fourth embodiment described above for Er-doped fiber laser may also be used for laser power and energy scaling with close to diffraction limited laser beam quality when an Tm$^{3+}$-doped LMA fiber is used (with appropriate selection of MO wavelength and spectral properties of all other system components, appropriate for a Tm$^{3+}$ fiber laser). This fifth embodiment achieves pulse and CW laser operation at virtually any laser line in the 1850-2150 nm spectral range as well as operation of these lasers via nonlinear frequency conversion to higher harmonics of the fundamental frequencies at red, blue, green and UV wavelengths.

As shown in FIG. 7, a laser source in accordance with the fifth embodiment may employ a fiber coupled CW seed laser 710 with an operating wavelength of 1944 nm and spectral line width of <30 MHz. Seed laser may be coupled to a fiber coupled isolator 712, an amplifier/pre-amplifier 714, a fiber coupled electro-optical intensity modulator 716 that produces 10 kHz optical pulses with a 1 ns pulse width. The laser light pulses are provided to a narrow band-pass filter 718, to a fiber coupled optical isolator 720, and to a single or multi-stage Tm-doped PM fiber booster amplifier 730 comprising a fiber amplifier 732, followed by a band-pass filter 734, an optical isolator 736 and may also contain an un-doped fiber 738. Fiber amplifier 732 may employ as a gain fiber a cladding pumped DC LMA Tm$^{3+}$-doped fiber, such as a PM Nufern LMA DC Tm$^{3+}$-doped fiber (i.e., PLMA-TDF-25/400). The output end of the Tm$^{3+}$-doped cladding pumped gain fiber is preferably end-capped and angle cleaved or polished with more than 8 degrees between the polished surface and the direction of the core propagating light. Pulses at 1944 nm and approximately 10 μJ from the Tm-doped fiber laser having a 10 kHz pulse repetition rate and 1 ns pulse duration may be further amplified in a diode pumped Tm$^{3+}$: GdVO$_4$ bulk laser amplifier 740 having its maximum gain near 1944 nm. Thus, amplifier 740 produces minimum ASE and good conversion efficiency. The bulk amplifier may employ either single or multi-stage amplification geometries for stored efficient energy extraction from the bulk amplifier and for an output pulse energy level of tens of mJ. Further nonlinear frequency conversion of the fundamental laser frequency at 1944 nm to its 4$^{th}$ harmonic using nonlinear optical crystals 742, 744 produces a 486 nm wavelength with about 1 mJ of close to transform limited pulse energy with a narrow spectral line-width, 1 ns pulses, and over 10 W of average power, which is what is required for free space communications. This spectral line corresponds to the position of one of the most intense Fraunhofer lines used for free space and underwater communications, and corresponds to the minimum absorption of the deep water. Using high pulse energy and high average power, this 486 nm laser opens up new opportunities in free space and underwater communications.

The invention affords a way to scale the pulse energy and average output power of the Tm$^{3+}$-doped blue or UV fiber lasers. It affords pulse and CW operation of Tm$^{3+}$ fiber lasers based on PM single clad and/or PM LMA, DC Tm$^{3+}$-doped gain fibers optically cladding pumped either resonantly into the 1650 nm absorption band or the 795 nm absorption band of Tm$^{3+}$ in fiber glass. The gain band of Tm$^{3+}$ doped fibers is from approximately 1850 nm to over 2100 nm.

As described, the invention may employ a Tm$^{3+}$-fiber laser, where external cavity, narrow line-width SOA based fiber coupled laser operating in a Littrow or Littman configuration that may be used as a fiber coupled CW seed laser. A CW diffraction grating based tunable fiber coupled diode laser for 2 μm spectral range, a 150 kHz spectral width and an operating wavelength of 1944 nm may be intensity modulated by a fiber coupled Mach-Zhender intensity modulator, such as previously described, with a 1 ns pulse width and a 10 kHz pulse repetition rate. The output of the modulator may be amplified in a PM single clad, core pumped Tm fiber (for example a Nufern model PM-TSF-9/125) with a 1550 nm SM fiber coupled laser diode. The output of the PM SM Tm-doped fiber amplifier may be supplied to a fiber coupled optical isolator and a narrowband pass filter to prevent possible back reflection from subsequent amplifier stages and suppress residual ASE. The resulting light is then injected in a PM Tm-doped fiber amplifier based on PM LMA DC Tm$^{3+}$-doped fiber (an example is PM version of Nufern LMA DC Tm$^{3+}$-doped fiber, i.e., a PLMA-TDF-25/400). The amplifier can be pumped with a fiber coupled diode lasers through a fused PM pump combiner. The pump ports of the pump combiner may be spliced to the fiber coupled low brightness, multimode diode lasers with oscillation wavelengths near 1550 nm (resonant pumping of Tm$^{3+}$ into the 1650 nm absorption band). The pump light is thus coupled into the cladding of the Tm-doped DC gain fiber. Multiple Tm-doped amplifier stages can be used to achieve maximum peak power before the onset of nonlinear processes which limit further power scaling. The resulting pulses may be injected into the diode pumped Tm$^{3+}$:GdVO$_4$ laser crystal acting as a pulse energy amplifier booster at 1944 nm (as shown in FIG. 7). Dual or multi-pass amplification geometries can be used to increase the amplifier energy extraction efficiency. The laser pulses of the fundamental frequency are then nonlinearly frequency converted to the higher optical harmonics through SHG and FHG to wavelengths of 972 nm and 486 nm.

While the foregoing has been with reference to particular embodiments of the invention, it will be appreciated that changes may be made to these embodiments without departing from the principles and spirit of the invention, the scope of which is defined by the appended claims.

The invention claimed is:

1. A laser system for generating laser emissions in the ultraviolet or visible spectral range comprising:
    a master oscillator laser providing laser emissions on a single wavelength in one of the ranges 972-985 nm, 1530-1610 nm or 1800-2150 nm;
    a fiber laser amplifier having a spectral gain band that encompasses the master oscillator wavelength for amplifying the laser emissions, the fiber laser amplifier comprising a single series coupled chain of a fiber laser pre-amplifier system, a pumped fiber laser power amplifier system, and a bulk crystalline laser amplifier;
    the bulk crystalline laser amplifier having a spectral gain band that encompasses the wavelength of the master oscillator laser emissions for amplifying the laser emissions from the fiber laser power amplifier system and for providing a further amplified output at said wavelength; and
    a non-linear frequency conversion unit for converting said further amplified wavelength from the bulk amplifier to a wavelength in the ultraviolet or visible spectral range.

2. The laser system of claim 1, wherein the bulk crystalline amplifier is matched to the master oscillator laser and fiber laser amplifier such that it has a gain band that spectrally overlaps the wavelength of the laser emissions from the fiber laser amplifier, and such that it is capable of producing pulses having pulse energy of at least 0.5 mJ, average power of at least 0.005 W and pulse widths in the range of 0.1 to 10,000 nanoseconds.

3. The laser system of claim 1, wherein said master oscillator laser wavelength is in a spectral range of 972-985 nm, and said pumped fiber laser power amplifier system comprises a gain fiber doped with $Yb^{3+}$ that is pumped at approximately 915 nm, and said bulk crystalline laser amplifier comprises active laser crystalline material doped with one of $Yb^{3+}$ or $Cr^{3+}$ or a $Ti^{3+}$:sapphire crystal.

4. The laser system of claim 3, wherein said bulk crystalline laser amplifier comprises $Yb^{3+}$ active crystalline materials and is pumped at approximately 940 nm.

5. The laser system of claim 1, wherein said master oscillator laser wavelength is in a spectral range of 1530-1610 nm, and wherein said pumped fiber laser power amplifier system comprises a gain fiber doped with $Er^{3+}$ or $Er^{3+}$—$Yb^{3+}$ that is pumped at either approximately 980 nm, approximately 1480 nm or approximately 1530 nm, and said bulk crystalline laser amplifier comprises $Er^{3+}$-doped or $Er^{3+}$—$Yb^{3+}$ co-doped active crystalline materials and is pumped either at approximately 980 nm, or approximately 1480 nm or approximately 1530 nm.

6. The laser system of claim 1, wherein said master oscillator laser wavelength is in a spectral range of 1800-2150 nm, and wherein said pumped fiber laser power amplifier system comprises a gain fiber doped with $Tm^{3+}$ that is pumped at either approximately 800 nm or 1650 nm, and said bulk crystalline laser amplifier comprises $Tm^{3+}$ doped, active crystalline materials and is pumped either at approximately 800 nm or approximately 1700 nm.

7. The laser system of claim 1, wherein said master oscillator laser wavelength is in a spectral range of 1950-2200 nm, and said pumped fiber laser power amplifier system comprises one of a pumped gain fiber doped with $Ho^{3+}$ that is pumped at either approximately 1150 nm or 1900 nm or a pumped gain fiber doped with $Tm^{3+}$ that is pumped at either approximately 800 nm or 1650 nm, and said bulk crystalline laser amplifier comprises $Ho^{3+}$ doped, active crystalline materials and is pumped either at approximately 1150 nm or approximately 1900 nm.

8. The laser system of claim 1, wherein said bulk crystalline laser amplifier comprises laser active crystalline materials selected from the group doped with trivalent rare-earth ion materials and trivalent or tetravalent transition metals doped materials.

9. The laser system of claim 1, wherein said crystalline bulk laser amplifier has at least one single-pass laser amplifier stage, and has a thin disk geometry to afford power scaling proportional to S/d, where S is an area of the thin disk and d is a thickness of the thin disk.

10. The laser system of claim 1, wherein said crystalline bulk laser amplifier has at least one single-pass laser amplifier stage, and has a thin slab geometry to afford power scaling proportional to w/b, where w is a width of the thin slab and b is a thickness of the thin slab.

11. The laser system of claim 1, wherein said crystalline laser amplifier comprises crystalline or crystalline ceramic rod, disk or slab shaped laser amplifier elements having un-doped bulk amplifier material diffusion bonded to or optically contacting a largest surface of the bulk amplifier active element for wave-guiding and heat management within the bulk amplifier, and wherein said un-doped bulk amplifier material comprises one of sapphire, YAG, Silicon and other semiconductor materials.

12. The laser system of claim 1, wherein said fiber laser amplifier comprises one or more stages, each amplifier stage being separated by an optical isolator and by a spectral bandwidth filter.

13. The laser system of claim 1, wherein said nonlinear frequency conversion unit comprises nonlinear optical crystals to generate said wavelength in the ultraviolet range through nonlinear frequency harmonic generation.

14. The laser system of claim 1, wherein said master oscillator laser provides continuous wave laser emissions, and the system further comprises a controllable intensity modulator for converting said emissions to pulses having a selectable pulse width in the range of 0.1-10,000 nanoseconds and a pulse repetition rate in the range of 10 Hz to 100 MHz.

15. The laser system of claim 1, wherein said master oscillator laser provides pulse laser emissions having a selectable pulse width in the range of 0.1-10,000 nanoseconds and a pulse repetition rate in the range of 10 Hz to 100 MHz.

16. A laser system for generating laser emissions in the ultraviolet or visible spectral range comprising:
   a master oscillator laser operating on a single wavelength in the infra-red spectral region;
   a hybrid fiber—bulk crystalline laser amplifier system comprising a single series connected chain of fiber amplifiers comprising $Er^{3+}$ or $Er^{3+}$—$Yb^{3+}$ doped gain fiber coupled to solid state Ti:sapphire bulk crystalline amplifier for providing high energy laser pulses having pulse energy greater than about 0.5 mJ; and
   a non-linear frequency conversion unit coupled to said crystalline amplifier for converting said pulses to pulses in the ultraviolet or visible spectral range.

17. The laser system of claim 16 further comprising a second harmonic generator coupled between the fiber amplifiers and the bulk crystalline amplifier for converting wavelength by one-half prior to amplification in the bulk crystalline amplifier.

18. A laser system for generating laser emissions in the ultraviolet spectral range comprising:
   a master oscillator laser operating on a single wavelength at approximately 980 nm;
   a power amplifier system coupled to the output of the master oscillator laser, the power amplifier system comprising a single chain of one or more series connected pumped $Yb^{+3}$-doped gain fiber amplifier stages for providing power amplified pulses at said wavelength of approximately 980 nm; and
   a non-linear frequency converter for converting said power amplified pulses to laser pulses at a wavelength of the order of 196 nm.

19. The laser system of claim 18, wherein said gain fiber comprises polarization maintaining LMA gain fiber that is coiled for spatial mode filtering and heat sinked.

20. The laser system of claim 18 further comprising a bulk solid state amplifier comprising active laser crystalline material doped with one of $Yb^{3+}$ and $Cr^{3+}$, or a $Ti^{3+}$:sapphire crystal for further amplifying said power amplified pulses to provide high power pulses at said approximately 196 nm wavelength.

21. The laser system of claim 18 further comprising a fiber pre-amplifier system between said master oscillator laser and said power amplifier system, the fiber preamplifier system comprising a Yb-doped gain fiber amplifier pumped at approximately 915 nm.

22. The laser system of claim 18, wherein said master oscillator laser outputs continuous wave laser emissions, and the system further comprising a controllable intensity modulator for converting said laser emissions to pulses having a selectable pulse width in a range of the order of 0.1-10,000 nanoseconds and a pulse repetition rate in the range of 10 Hz to 100 MHz.

23. A method of generating laser emissions in the ultraviolet or visible spectral range comprising:
   generating laser pulses at a single wavelength in one of the ranges 972-985 nm, 1530-1610 nm or 1800-2150 nm;
   amplifying said laser pulses in a fiber laser amplifier system having a spectral gain band that encompasses said wavelength of the pulses, said fiber laser amplifier system comprising a single chain of series connected gain fiber amplifiers doped with an element selected from the group consisting of $Yb^{3+}$, $Er^{3+}$, $Er^{3+}$—$Yb^{3+}$, $Tm^{3+}$ and $Ho^{3+}$;
   further amplifying said laser pulses from said single chain of fiber amplifiers in a bulk crystalline amplifier to produce high power laser pulses having a pulse energy on the order of 0.5 mJ or greater; and
   non-linearly converting said high power laser pulses to a wavelength in the ultraviolet or visible spectral range.

* * * * *